June 12, 1962
M. H. HILL
3,038,655
DEVICE FOR FORECASTING TIME OF A RACE HORSE
Filed Feb. 25, 1959
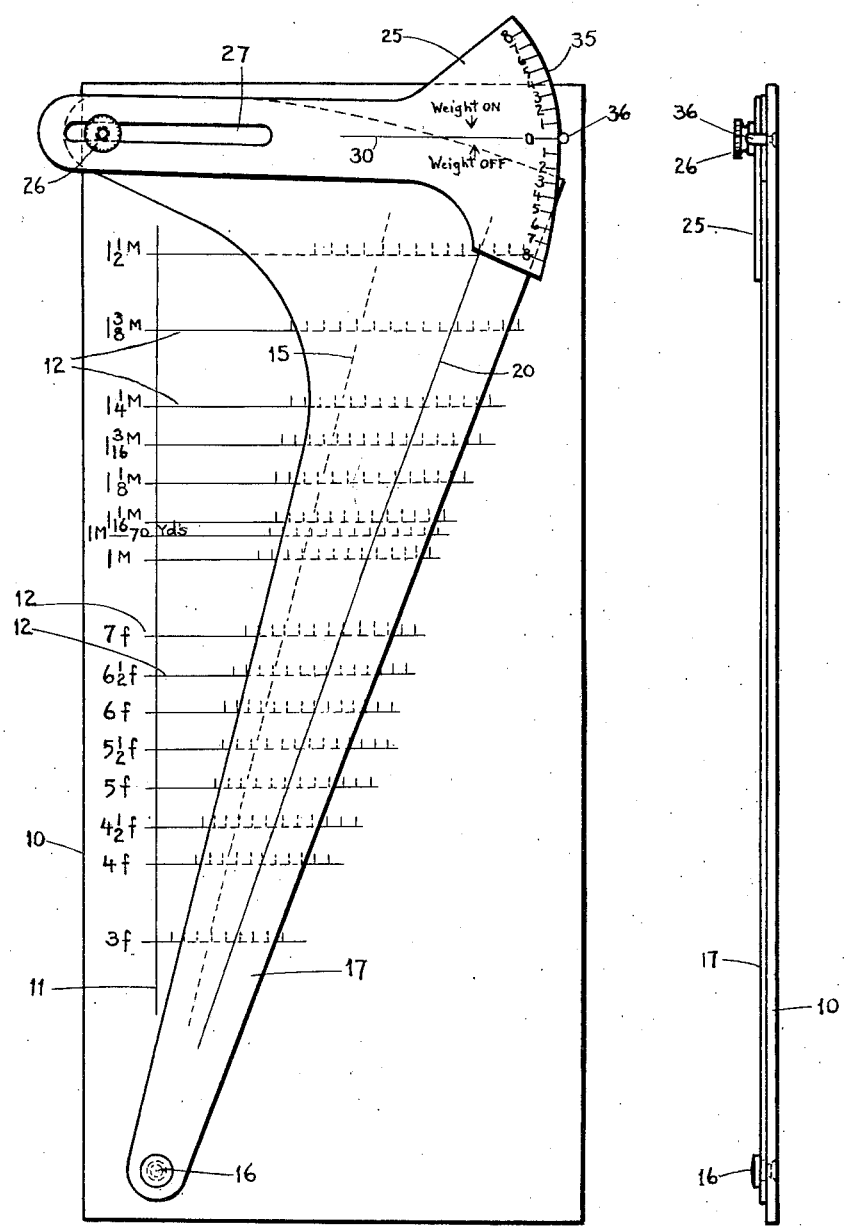
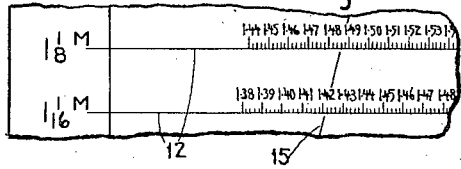
INVENTOR.
Maxwell H. Hill.
BY
B Schlesinger Attorney

United States Patent Office 3,038,655
Patented June 12, 1962

3,038,655
DEVICE FOR FORECASTING TIME OF A RACE HORSE
Maxwell H. Hill, 825 Commerce Bldg., Rochester, N.Y.
Filed Feb. 25, 1959, Ser. No. 795,390
3 Claims. (Cl. 235—61)

The present invention relates to instruments by which a diminishing or increasing set of values may be compared to forecast a future result. In a more specific aspect, the invention relates to an instrument for making comparisons of varying increments of time. Still more specifically, the invention relates to an instrument for predicting the future performance of race horses.

There are many form sheets, and some newspapers printed which give the performance records of race horses, so that a person endeavoring to determine the winner of a given future race may ascertain the time at which a particular horse ran previous races, the distance thereof, what weight was carried, what the condition of the track was, etc. To arrive at any decision as to what a horse is likely to do in the given race, the sportsman has to put in a lot of time studying the form sheets, or form data, and then has to make, at best, a guess as to how the horse is likely to perform in the race in question.

One object of the present invention is to provide an instrument whereby a person can predict with much better chances of correctness how a horse is to perform in a given race than is possible simply by study and comparison of past performance records from form sheets or form data.

Another object of the invention is to provide a device of the character described which is simple in construction, easy to operate, and will be reasonable in cost.

Other objects of the invention will be apparent hereinafter from the specification and from the recital of the appended claims.

In the drawing:
FIG. 1 is a front view of an instrument built according to one embodiment of this invention for predicting the future performance of race horses;
FIG. 2 is a side view of this instrument; and
FIG. 3 is a fragmentary front view on an enlarged scale showing in more detail how the instrument is graduated.

The present invention is based upon the idea of making comparisons of the past performance or performances of a horse over a certain distance or distances with an average of the performances of horses in a "near best" group in order to arrive at a certain predicted time for a future performance for a given distance of the horse under consideration. Compilation of the results of a great many races has shown the advisability of comparing the performance of any horse with the performance of the average best horses over various distances. Horses that rate near the best will perform consistently in their class. Horses that rate away from "near best" will show increasing inconsistency; and if of poor class do not merit consideration.

It is a well known fact that race horses in general make better time per unit of distance in short races and that as the distances are increased, the time per unit of distance increases. Thus, a horse that rates "near best" will require a somewhat longer time per furlong in longer races, and slower horses will run noticeably slower in longer races. Therefore, it would be impossible to arrive at the expected time of any horse over a long distance by simple arithmetical calculation from the time of the horse running at a shorter distance. Riders themselves are trained, therefore, to rate their mounts according to the ability of the horse and the distance being run.

The device of the present invention, however, enables the user to read directly from graduated scales the time required for any horse to run a long or a short distance, according to the horse's ability as based on past performances. The weight carried by the horse is also of great importance; and the weight assigned in the given race should be compared to weight that has been carried by the animal in its best recent performances for a similar distance. It is a well-known fact that additional weight will slow a horse much more than reduced weight would enable the horse to speed up. The device of the present invention permits of taking into consideration the weight to be carried by the horse in a given future race in forecasting the performance of the horse in that race.

Referring now to the drawing by numerals of reference, 10 denotes a plate or board on which is inscribed in a vertical column at one side of the line 11 the various distances at which most flat horseraces are run. For convenience, these distances are indicated in furlongs up to one mile and thereafter in distances of a mile and a fraction. "3f" indicates, for instance, a distance of three furlongs; "7f" denotes a distance of seven furlongs; "1M" indicates a distance of one mile; and "1⅜M" denotes a distance of one and three-eighths miles. The vertical spacing between successive furlong indicia is proportionate to the distance indicated; and the same is true for the distances indicated in fractions of a mile.

Opposite each of the several designations of distance there are graduations denoting time. In the instance shown, these graduations are arranged along horizontal lines 12 which are perpendicular to the line 11. As shown in FIG. 3, on an enlarged scale, the graduations along each of the lines 12 are in units of time and are equi-spaced. Thus, for the distance 1¹⁄₁₆ miles, graduations are shown in seconds and in fifths thereof between the times one minute thirty-eight seconds and one minute forty-eight seconds. Every fifth graduation is a higher line and denotes seconds. The shorter lines or graduations denote fifths of seconds.

Similar graduations are arranged opposite each of the distances in the vertical column. Thus, the graduations opposite the distance one and one-eighth mile are also arranged in fifths of seconds. It will be noted, however, that here they begin with one minute forty-four seconds and run to one minute fifty-four seconds, and that the graduation for one minute forty-four seconds is not directly over, that is, vertically aligned, with the same graduation on the scale opposite the distance one and one-sixteenth mile, but is laterally displaced to the left thereof. This is done in order to conserve space. No horse ever runs a mile and one-eighth in a time of from one minute and thirty-eight seconds to one minute and forty-four seconds, which are, however, possible times for a mile and one-sixteenth. Therefore, the graduation for one minute and thirty-eight seconds to one minute and forty-four seconds are omitted from the graduations opposite the distance one mile and one-eighth. In fact, it is preferred that the graduations against each of the distance marks be within the practical range for that distance. If desired, however, the graduations one minute forty-four seconds on all of the scales could be placed one above the other, and all of the graduations on all of the scales would be in vertical registry with one another.

It is not practical to show the graduations opposite the distance marks on the scale of FIG. 1. That is why the fragmentary view on an enlarged scale is shown in FIG. 3.

Scribed on the plate or board 10 is a curve 15 which indicates against the scales the times for the average best performances at the various distances on the scale. This line 15 is provided as a matter of convenience to afford the user a set, easily readable "average best" performance reference curve.

Pivotally mounted at 16 on the board 10 is an arm or vector 17 on which is scribed a line 20, identical to the curve 15 and also denoting a curve of average best performance. As will be obvious as the arm 17 is moved about its pivot point 16, the line 20 scribed on the arm may be set to read against a particular graduation for some particular distance based upon the performance of a given horse at that particular distance, and where line 20 crosses the graduations 12 for other distances it will indicate the probable time of the horse for these other distances. It will compensate automatically for the additional time required at those distances for this horse if the horse rates slower than average best.

Mounted on the arm 17 at the top thereof is a slidable and pivotable member 25, which is adjustably secured to the arm 17 by means of a binding screw 26 that passes through an elongate slot 27 in this member 25 and that is secured to arm 17 by any suitable means such as threading, riveting, or a pressfit. The member 25 is enlarged in height at its right hand end and is provided with graduations at that end, which denote pounds of weight. A zero line 30 disposed in central alignment with the slot 27 denotes the average weight carried, or a given weight. The graduations 1 to 8 inclusive above this zero line denote, respectively, pounds above this base weight; and the graduations 1 to 8 inclusive below the line denote, respectively, the numbers of pounds below the base weight. At its right hand end the slide 25 is formed with an edge or marginal cam surface 35 which is adapted to engage a pin 36 that is secured in the plate 10.

The curves 15 and 20, and the curve 35 are determined empirically by an analysis of the finishing times of a great number of races. The lines 15, 20 and 35 have been arrived at by combing through many racing results. Super horses are so few, and also so unusual, that they have been omitted from the basic calculations made in determining this curve. There would be no reason to compare all horses to a few outstanding horses. There is good reason to compare capable horses with "average best." Good race horses will race consistently. This device is intended primarily for use on tracks where good horses are run.

To use the instrument, the user determines from a racing form chart, giving the past performances of all horses entered in a given future race, the time required for a given horse in its most recent race, or races, to complete that race or races. If the horse was the winner of the race, the time given on the form chart is that horse's time. This time is given in minutes and seconds and fifths of a second. If the given horse, which is to be handicapped, was beaten in his last race by say three lengths, we add three fifths of a second to the time of the winner to obtain the approximate time required by the horse under consideration to cross the finish line. A general rule, widely used, is to consider one horse length as a fifth of a second in time. Then the arm 17 is set so that its curved index line 20 intersects the time scale 12, which is opposite the distance which the horse last run, at the actual or estimated time for the horse to complete that race. When the curve 20 is read against the graduations for a different distance, this will give the estimated time for the horse to finish that different distance. Averaging of the times can be made if the user of the chart has the times of the horse for different recent races.

If the weight to be carried by the horse in the given future race is over or under the weight which the horse carried in its best recent performance, compensation must be made for this change in weight. It is well known that some horses are capable of carrying more weight than others even though standard allowances are made for sex and age. To compensate for the difference in weight, the binder screw 26 is loosened and, without disturbing the position to which the arm 17 has been adjusted as described above, the slotted member 25 is brought to contact the stop pin 36 with its central index line aligned therewith. The binder screw is now tightened lightly to secure the slotted member to the arm 17. Then by swinging the slotted member up or down in accordance with the change in weight and by keeping the cam surface in contact with the stop pin 36, the arm 17 is automatically adjusted to compensate for weight changes. The user may now scan the index line or curve 20 to forecast the time of the horse for the various distances given on the plate 10.

A three furlong increase in distance is considered a maximum forecast for this instrument, but as race horses seldom, if ever, run a distance greater than three furlongs over their normal racing distance, this in no wise limits the practicability of the instrument; a normally seven furlong racer would not be expected to enter an eleven furlong race, that is, it would not be expected to run at a distance four furlongs greater than its normal running distance. Racing secretaries and track handicappers, however, make every effort to group horses according to the distances at which they are accustomed to run and have the best capability of running.

It can readily be seen that as the user analyzes each horse entered in a future race by means of the instrument of the present invention, the expected time of finishing for each horse can be determined, and the lowest time will indicate the probable winner.

The member 25 is located at the top of the arm 17 in order to show the maximum correction for the influence of weight changes in longer races. It is well known that the effect of weight changes is much more pronounced the greater the distance run.

While the invention has been disclosed in connection with an embodiment for predicting the running of a race horse, it will be obvious that it may be, with suitable modification in scales or graduations and in averaging curves, used in forecasting times for other races, such as dog races, human track events, and various other performances where past performance times or other values may be compared by an averaging curve to predict a future result.

While the invention has been described, then, in connection with a specific embodiment thereof, it will be understood that it is capable of further modification.

Having thus described my invention, what I claim is:

1. A device for predicting the outcome of a horse race comprising a plate having a plurality of spaced indicia arranged thereon in columnar fashion one above another and denoting, respectively, different racing distances, and parallel rows of graduations extending laterally of said indicia and denoting, respectively, time intervals for a respective distance, an arm pivotally mounted adjacent one end on said plate and having a curve thereon to read against a plurality of said rows of graduations simultaneously, said curve being determined from the results of a plurality of races, an adjustable cam member slidably and pivotally mounted on said arm adjacent the free end thereof, said cam member having its active cam surface at one edge thereof and being graduated to show weights above and below a predetermined average, a follower carried by said plate engaging said cam surface and serving as an index point for said graduated cam surface, said cam member being slidable into an adjusted position on said arm without disturbing the position of said arm, and means for securing said cam member to said arm to permit pivoting of said cam about said adjusted position to cause said arm to be rocked on its pivot when the graduations of said cam are adjusted against said follower.

2. A device for predicting the outcome of a horse race comprising a plate having a plurality of spaced indicia arranged thereon in columnar fashion and denoting, respectively, different racing distances, a set of graduations extending normal to each indicium and denoting different times for running the indicated distance, an arm pivotally mounted on said plate and having a curve thereon readable against a plurality of said sets of graduations simultaneously, and a member slidably and angularly adjustable on said arm, said member having a plurality of graduations thereon which denote weights above and below a predetermined average, said member having a cam surface thereon, a follower on said plate engaging said cam surface and serving as an index point for angular adjustment of said member on said arm, and means for securing said member to said arm to prevent sliding therebetween and to adjust said arm about its pivot upon angular adjustment of said member on said arm.

3. A device for predicting the outcome of a race comprising a plate having a plurality of spaced indicia arranged thereon in columnar fashion one above another and denoting, respectively, different distances, and a row of graduations aligned laterally with each indicium and denoting time intervals, a member mounted on said plate for pivotal adjustment thereon and having a curve thereon to read against a plurality of said rows of graduations simultaneously, a cam mounted on said member for adjustment relative thereto after pivotal adjustment of said member, said cam having graduations thereon indicative of variations of a given condition affecting the race, a follower fixed to said plate to engage said cam, said follower serving also as an index mark against which the graduations of said cam are readable, and means on said member for securing said cam to said member in adjusted position thereon, whereby upon pivotal movement of said cam until a selected graduation on said cam reads against said follower the position of said member will be modified to compensate for a given condition.

References Cited in the file of this patent

UNITED STATES PATENTS

| | | |
|---|---|---|
| 280,772 | Tucker et al. | July 3, 1883 |
| 2,157,705 | Jones | May 9, 1939 |
| 2,405,803 | Thurston | Aug. 13, 1946 |
| 2,551,997 | Cody | May 8, 1951 |
| 2,846,143 | Birkness | Aug. 5, 1958 |